United States Patent [19]

Niederwemmer

[11] 3,849,991

[45] Nov. 26, 1974

[54] IRRIGATION SYSTEM

[76] Inventor: Paul Niederwemmer, Im Birkenbusch 7, 44 Munster, Germany

[22] Filed: Sept. 13, 1972

[21] Appl. No.: 288,774

[52] U.S. Cl. .................................. 61/13, 261/78 A
[51] Int. Cl. .......................................... E02b 13/00
[58] Field of Search ..................... 61/13, 10, 11, 12; 261/78 A; 210/150, 287; 47/1

[56] References Cited
UNITED STATES PATENTS

| | | | |
|---|---|---|---|
| 490,146 | 1/1893 | James | 137/625.33 |
| 980,442 | 1/1911 | Schlafly | 61/10 |
| 1,939,924 | 12/1933 | Schimrigk | 210/150 |
| 2,362,747 | 11/1944 | Duke | 61/12 |
| 2,364,298 | 12/1944 | Kamp | 210/150 |
| 2,809,933 | 10/1957 | Halvorson | 210/150 |
| 2,909,002 | 10/1959 | Hendry | 61/13 X |
| 3,309,875 | 3/1967 | Niederwemmer | 61/13 |
| 3,369,367 | 2/1968 | Saad et al. | 61/11 |
| 3,461,675 | 8/1969 | Izzat | 61/13 |
| 3,479,825 | 11/1969 | Hellstrom | 61/13 |
| 3,498,028 | 3/1970 | Trouw | 261/78 A |
| 3,570,251 | 3/1971 | Roberts | 61/10 |
| 3,578,432 | 5/1971 | Stiles | 47/1 |
| 3,722,679 | 3/1973 | Logue | 261/DIG. 75 |

OTHER PUBLICATIONS

"The Beneficial Utilization of Liquid Fertilizer on Land" The Metropolitan Sanitary District of Greater Chicago, Aug. 18, 1970, pages 66–67, 24.

Primary Examiner—W. C. Reynolds
Assistant Examiner—Alex Grosz
Attorney, Agent, or Firm—Merchant, Gould, Smith & Edell

[57] ABSTRACT

An irrigation system is shown in which concrete water afferent ditches surround the field to be irrigated. Parallel, trough-shaped insulation layers are laid under the level of cultivation between opposite water afferent ditches. A layer of gravel is placed in each trough-shaped layer, and a subsurface irrigation pipe with bottom openings is laid on the gravel, extending between the ditches. Openings in the ditches lead to both the irrigation pipes and the gravel layer. Also shown are slide valves for controlling flow through the ditches, dripscreens for purifying waste water, and a water cataract system for oxygenating the water.

2 Claims, 15 Drawing Figures

PATENTED NOV 26 1974 3,849,991

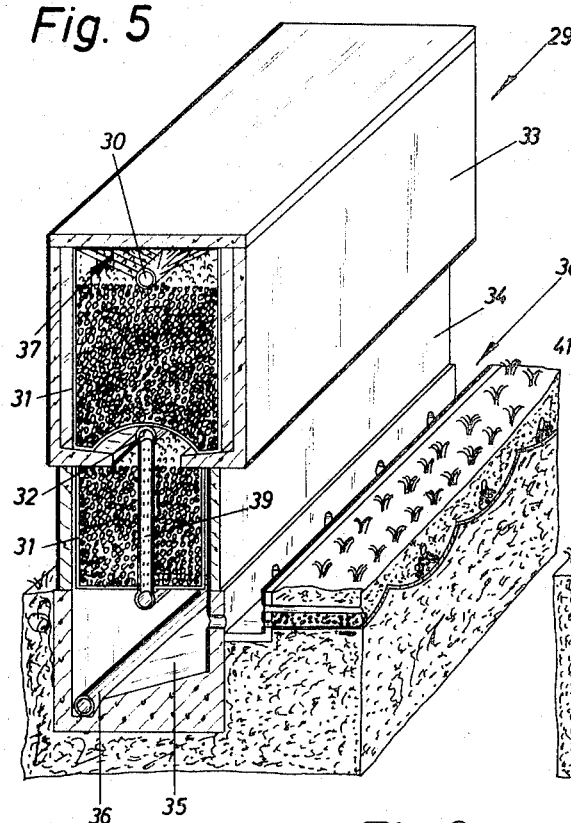
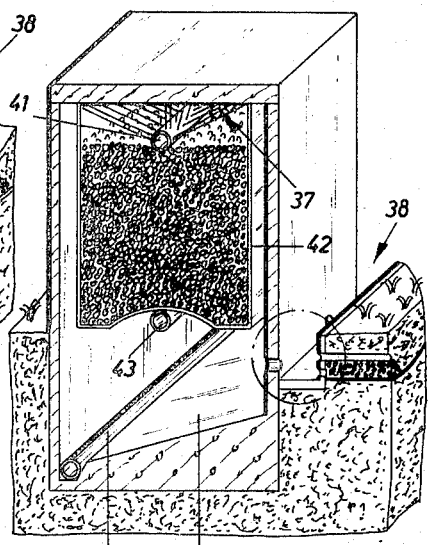
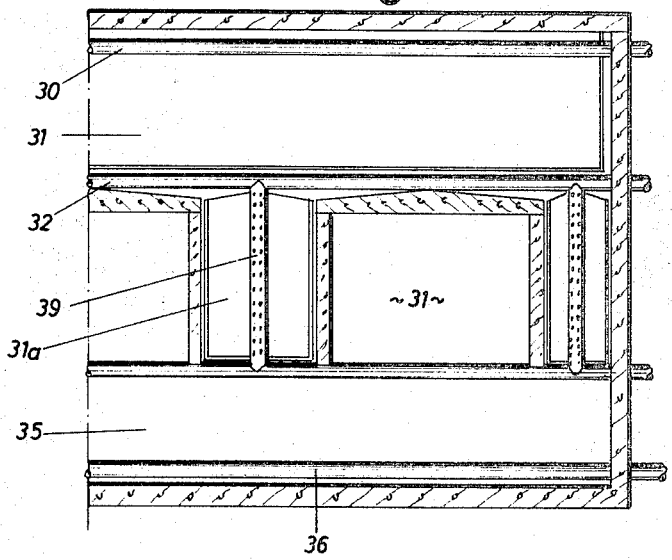

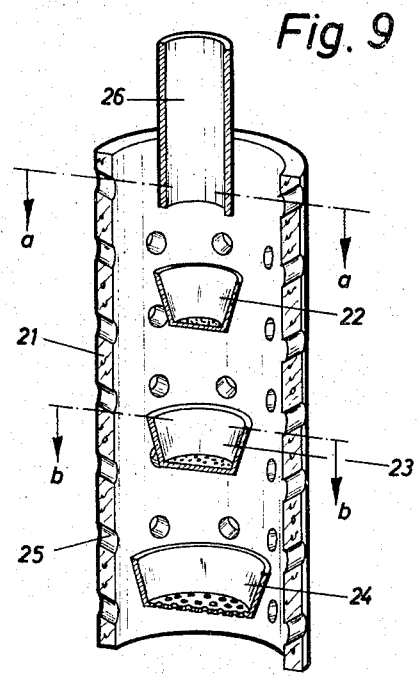
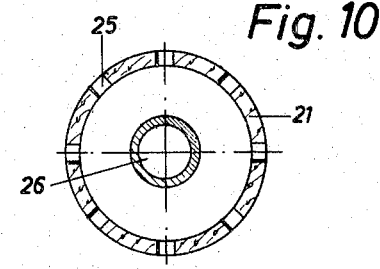
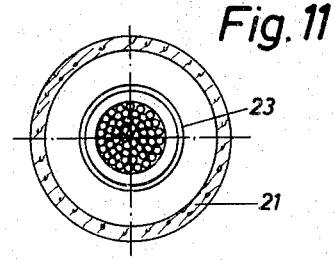
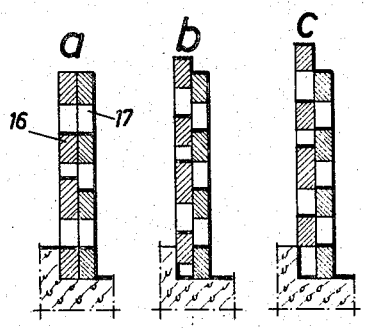
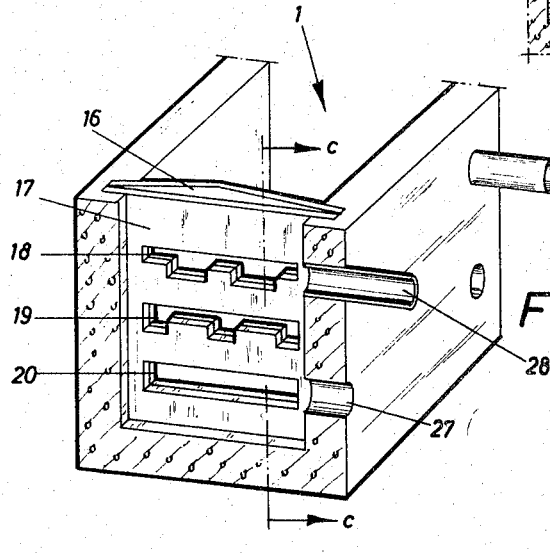

IRRIGATION SYSTEM

BACKGROUND OF THE INVENTION

1. Field of the Invention

The invention refers to a procedure for the irrigation of dry areas, using, when necessary, biologically treated waste water and an irrigation plant to implement the process.

2. Description of the Prior Art

A known way of irrigating dry areas is to create an almost completely level surface surrounded by low dikes, which surface is under water most of the time. This procedure is used mainly in pasture cultivation and, for example, for flooding surfaces planted with rice or sugar cane.

This procedure very often leads to acidification of the surfaces and, in the tropics and subtropics, to considerable salification of the soil in the space of a few years. In addition, the grading of the area as well as the construction and maintenance of the dikes requires large expenditures.

Also known are an irrigation procedure and a work vehicle for making an irrigation system, whereby a furrow is first dug which is then lined with a sloping watertight plastic foil, on which an irrigation pipe is laid. The furrow is then covered with soil, so that the upper edges of the foil lie beneath the maximum depth of soil cultivation.

However, when the irrigation pipes are laid and arranged in this fashion, there is no way to prevent them from silting up with time or from becoming congested by the intrusion of roots. Likewise, since the water seeps out only under ground, there is no sufficiently sure way of preventing the soil from becoming salified after several years or of avoiding unevenness in the water supply to the various parts of the field.

SUMMARY OF THE INVENTION

For this reason, the task of the invention is to create a procedure for irrigating dry areas which will combine the known advantages of subsurface and surface flooding irrigation with an adequate desalinization of the soil which can be done from time to time. Additionally, the invention has the task of using subsurface and surface flooding irrigation for the purification of waste water. For this task, the invention starts with using water which has already been mechanically and chemically depolluted and then subjects the water to further purification.

The subsurface and surface flooding irrigation procedure according to the invention is characterized by the following features: The creation of an artificial ground water table at a depth of about 0.7 – 1.00 m, i.e., beneath the root zone; a continuous supply of water to the plant roots at a soil level at which the oxygen required for root development is easily available to the plants; the surface of the soil remains dry, thus reducing evaporation considerably; and unproductive water loss is largely eliminated in the system.

The subsurface and water trapping irrigation system consists of the following components: "Main afferent ditches" bring the water from a canal, river, lake or from a pumping station or the like. "Field afferent ditches and/or field dispersion ditches" take the water brought by the main afferent ditches and direct it through "slide valves" which regulate the volume of flow, and on into the underground irrigation lines. The slide valves are also so installed that they can trap the water in the lines when closed. The "underground irrigation line" consists of a "trough-shaped barrier layer," which can be made of various materials such as resistant plastic foils, asphalt or bitumen emulsions, or artificial or natural fabric strips; and, in addition, can be covered with various materials. The subsurface barrier layers are in each case laid in parallel from the field afferent ditches in such a way that the two upper edges of a trough lie beneath the limit of soil cultivation. The barrier layers are not laid continuously but at certain intervals.

The irrigation line consists in addition of the "irrigation pipe". The pipe is laid with a gradient on 2 percent of a layer of gravel or coarse sand on the bottom of the trough-shaped barrier layer. It may consist of a flexible cylindrical plastic pipe or of a two-part pipe which is semi-circular in cross-section. The cylindrical upper part is fitted into the flat lower part which is provided with lateral rims. For more rapid distribution, the water seeps from this lower part through crescent-shaped slits into the gravel or coarse sand layer. In addition there are "inlet and outlet openings" which open from the field afferent ditches and/or the field dispersion ditches directly into the porous gravel or coarse sand layer. They are to go into action so that the line can be thoroughly flushed if salinization takes place or so that they can be quickly drained in case of heavy rainfall.

"Additional systems" are provided to warm the water, and to enrich it with oxygen, mineral fertilizers, plant protection substances and soil treatment substances.

The field afferent ditches comprise prefabricated concrete sections and the irrigation lines are laid by machine in a single operation by means of a machine especially constructed for this purpose. By graduating the field afferent ditches, this system can also be employed on sloping terrain.

There are several advantages of the above-described system, as follows:

1. Preparation of the Terrain: In the area to be irrigated, fields 150 to 200 m wide and of any desired length are laid out in which the subsurface pipe interval may vary from 3 to 5 m as determined by soil parameters. It is convenient to separate these fields with strips of uncultivated land which provide space for vehicle traffic and are planted on both sides with bushes and trees. This planting provides effective protection against erosion and dessication of the soil, promotes the growth of the cultivated crop plants by forming a favorable microclimate in the project area and helps moreover to beautify the landscape.

The distance between the strips, their width as well as the type of protection tree to be planted are largely determined by local climatic conditions. The protective trees are likewise irrigated by subsurface pipes. 2. Water Conservation: Water losses by evaporation and seepage vary greatly from case to case in conventional irrigation procedures. With this procedure, evaporation losses can be completely avoided through the use of amounts of water which do not reach the surface. Seepage losses with subsurface and water trapping irrigation are eliminated by the insulation layer. Thus, with this procedure, water losses are to be expected only in case of improper installation or maintenance of the system. By avoiding water losses and by regulating the irrigation to conform to the actual water needs of the plants, considerable water savings are realized as compared with other irrigation procedures.

3. Adaptation to the Location: Neither high wind velocities, which impair or preclude sprinkling, nor sudden frosts damage the system, since its above-ground component can be very quickly emptied. Under heavy tropical rains it acts as a drainage system. In arid areas in the vicinity of deserts, hot winds causing extreme evaporation can greatly increase the water consumption of a set of plants. Under such conditions the procedure is especially advantageous, since it is possible to provide the plants with the amount of water required for transpiration without unnecessarily moistening the dessicated upper layer of soil.

4. Implementation and Maintenance: The subsurface irrigation system can be regulated with appropriate measuring, observation and control mechanisms in such a way that optimal efficiency can almost always be achieved. It is therefore especially suited, indeed, predestined for automation.

In comparison with other irrigation procedures, the system with its artificial ground water table is outstandingly suited for the application of plant nutrients. With this system, the amounts applied can be advantageously adjusted to the requirements of the set of plants, thereby facilitating the application to field agriculture of knowledge gained in hydroponics.

Supplying water to the plants by means of an appropriate saturation of the root area is doubtless the best solution, especially if the water supply can be regulated continuously, i.e., not in abritrary steps. Such is the case with the subsurface and water trapping irrigation procedure.

When waste water is used, a drop-screen system is interposed before the system described above.

BRIEF DESCRIPTION OF THE DRAWINGS

FIG. 6 is a sectional side view of FIG. 5;

FIG. 7 is another sample version of a tank with drip-screens, water afferent ditches and irrigation pipes leading from these;

FIG. 8 is an enlarged illustration of the water afferent ditch and the irrigation pipe according to FIG. 7;

FIG. 9 is a water cataract system with troughs for aereation of oxygen-poor water;

FIG. 10 is a cross section along line a—a of FIG. 9;

FIG. 11 is a cross section along line b—b of FIG. 9;

FIG. 12 is a two-part slide valve for regulating the water input in the water afferent ditches;

FIG. 13 is a section along line c—c of FIG. 12;

DESCRIPTION OF THE PREFERRED EMBODIMENTS

Figure 1:
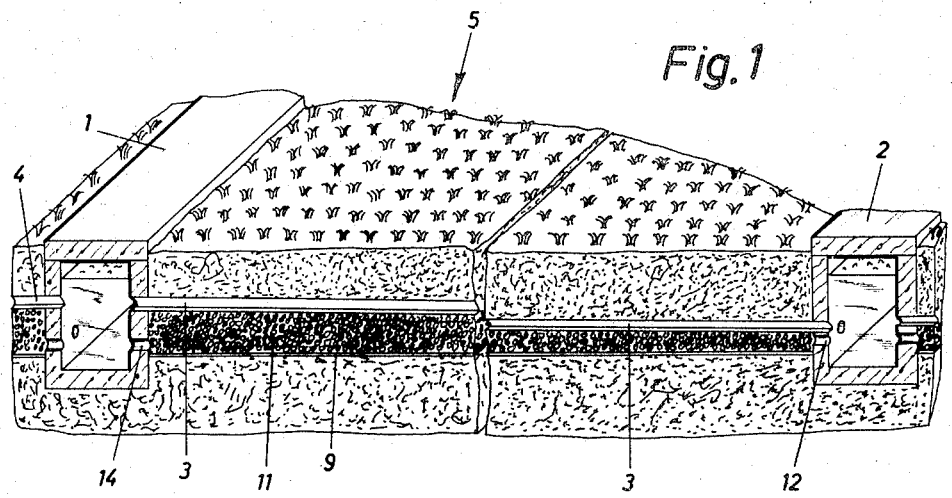
FIG. 1 is a cross section through an irrigation plant with two parallel water afferent ditches, which are connected with irrigation pipes on a lateral barrier layer.
Figure 2:
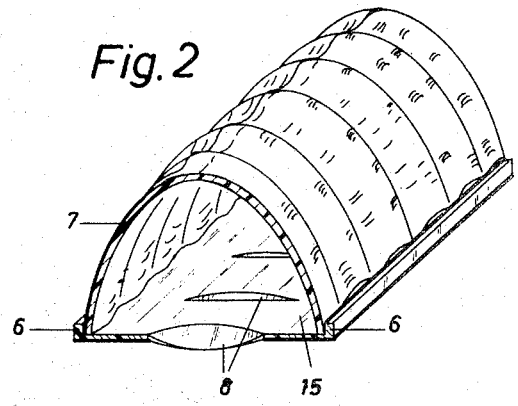
FIG. 2 is a cross section through an irrigation pipe.
Figure 3:
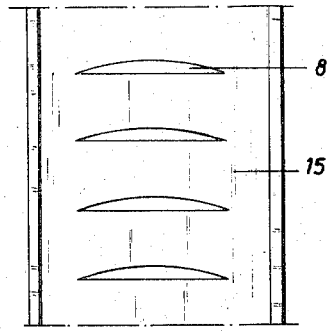
FIG. 3 is a top view of the bottom of an irrigation pipe according to FIG. 2.

In FIG. 1, a cross section through an irrigation system with two water afferent and/or water dispersion ditches 1, 2 is illustrated. The water afferent ditches run parallel, perpendicular to the plane of the drawing. From these ditches irrigation pipes 3, 4 with bottom slits lead to fields 5. These irrigation pipes have circular or approximately semi-circular or semi-elliptical cross sections and, in the latter two cases, they consist of a flat bottom 15 which runs lengthwise which has two cams or rims 6 which extend lengthwise on the right and left. A semi-cylindrical side panel 7 is then bent over these rims 6 and pinched or hooked together with them, as shown on FIG. 2. According to FIG. 3, the bottom 15 has slits 8 to allow the water to exit. The pipes may be made from a flexible plastic material.

Figure 4:
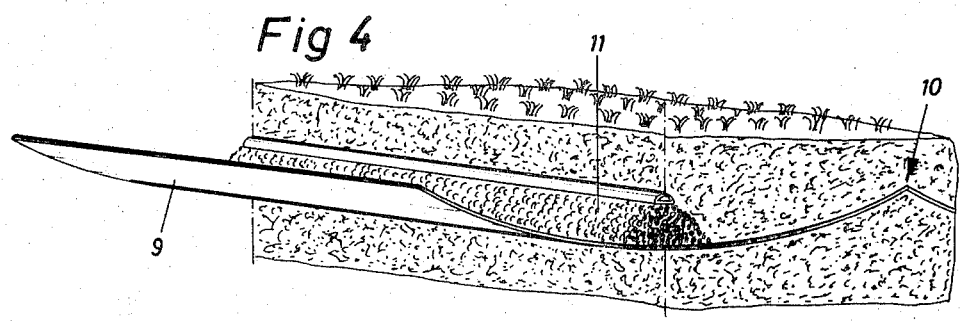
FIG. 4 is a trough-shaped barrier layer stretching between two water afferent ditches and along the lowest point of which a sloping irrigation pipe is installed; a FIG. 5 is an irrigation system for treating mechanically pre-purified waste water with an elevated tank and drip-screens.

Between the two water conduit ditches 1 and 2, which are also called secondary system or secondary ditches, barrier layers 9 are situated. As shown on FIG. 4, the insulation is set in the soil with a trough shape such that its upper edge 10 is above the deepest point thereof. In this way the insulation also serves in some degree to conduct the water. The base of the barrier layer may be a known plastic foil or tissue strip. In soils containing loess, loam or clay it is also possible to form a lasting and elastic barrier layer by spraying on emulsions of asphalt, bitumen or artificial resins. On the barrier layer there is a layer of gravel 11 on which the irrigation pipes 3, 4 are bedded with a gradient.

When the barrier layers are laid, they are set down horizontally and parallel in conformity with the natural soil contours. The edges of the barrier layer reach the water conduit ditches and are connected with these. However, the upper edge of the barrier layer, i.e., the uppermost edge 10 of the barrier layer troughs, lies beneath the maximum depth of soil cultivation.

The construction of the barrier layer and especially that of the irrigation pipes according to the invention effectively prevents the intrusion of roots or damage by the ends of sprouts. The barrier layer is firm enough to resist sprouts germinating beneath it. In addition, root and sprout-end repelling and destroying chemicals may be mixed in the emulsions used for the barrier layer. It should be further considered that as a result of the function of the water conduit ditches and the irrigation pipes, damage to the barrier layer is remedied in a brief time by silting in. According to previous experience, after a few years the barrier zone can be expected to silt in to such an extent that the barrier zone is rendered superfluous, after which time only the connections to the irrigation pipes continue to need to be checked.

According to FIG. 1 the irrigation pipes are connected to the water afferent and/or water dispersion ditches below the surface. In addition, at the depth of the gravel layer 11 the water conduit ditches likewise have inlets and outlets 12, 14 in order to permit direct seepage via the gravel layer when water requirements are elevated. The ditches can be closed by means of slide valves or gates at those points where they open into the primary ditches.

FIGS. 12 and 13 show a slide valve or sluice-gate which consists of two or several parts 16, 17 which can be pushed against one another. This slide valve has longitudinal slits 18, 19, 20, the openings of which can be varied when parts 16, 17 are slided with respect to each other. In position *a* in FIG. 13, the slide valve is in the widest open position. Position *b* illustrates a position corresponding to about half the flow-through volume of position *a*. In position *c* the slide valve is closed. This position is used to prevent water input from the secondary system and to initiate flooding of the insulation layers, which is described in the following.

In FIG. 12, 28 refers to the connection of an irrigation pipe to water afferent ditch 1 and 27 refers to the outlet opening into the gravel bed corresponding to the outlet openings 12, 14 according to FIG. 1. The formation of the slide valve according to the invention not only regulates the amount of water flowing through the afferent ditches which is to be brought to the fields, but the horizontal longitudinal slits 18, 19, 20 also cause a constant churning and mixing of the water with air. Thus, the water is additionally enriched with oxygen by the longitudinal slits. The irrigation system has now been sufficiently described to permit an understanding of the basic procedure according to the invention.

To distribute the water, it is trapped in or fed into the normally parallel water afferent ditches 1, 2. These water afferent ditches 1,2 form the secondary system which can surround the fields on all sides. Now, these ditches can be closed off by means of the sluice-gate so that the water floods the barrier layers. For this purpose, the pipes slope gently downwardly in the direction of flow. Flooding the system affords intense flushing and desalinization of the irrigation area. For normal irrigation of the fields, the above-described irrigation pipes 3, 4 are now provided with water from the secondary ditches 1,2. The water is thus conducted from the secondary system into the field sections and seeps out in the cultivated soil above the barrier layer. The combination of trapped water irrigation and subsurface irrigation thus provides excellent irrigation expecially for tropical and subtropical areas.

The secondary system is best arranged diagonal to the upper level lines according to the slope of the terrain. The slope of the terrain is compensated for by graduated levels built into the bottom of the secondary ditches. Corresponding to these graduations slide valves for regulating the water level are arranged in the surfaces to be irrigated. The secondary system terminates in main collection ditches which supply water, for instance, to subsequent lower lying fields. The fields are also supplied with water by means of reverse trapping or pooling into the secondary system. Thus the water off-flow from one series of fields can simultaneously provide the water in-flow for the next series of fields. In this way effective irrigation and trapping can be attained for instance in the case of terraced fields.

When the irrigation water is obtained from ground water, it is recommended that it be channeled through elevated tanks or reservoir tanks to achieve the necessary warming. Water brought from natural water courses is, on the other hand, usually sufficiently warmed.

Warm water is oxygen-poor. One possibility for enriching the water with oxygen was described in the case of the double function of the slide valves. An additional possibility is illustrated in FIG. 9. The water passes through a water cataract system which consists of an erect cylinder 21 with several troughs 22, 23, 24. The water is brought through conduit 26 and falls into a trough 22 which has a sieve-like floor. In the cylinder wall are openings 25, through which air from the outside can constantly enter cylinder 21 where it is carried along by the falling water. From sieve-trough 22 the water enters two subjacent overflow trough 23, 24, carrying air along all the while. For this reason the openings 25 are distributed over the entire height of the water cataract system. After passing through cylinder 21, the water is conducted to the water afferent ditches and seeps through the irrigation pipes (the so-called graduated container system). The openings 25 simultaneously provide for the introduction of artificial fertilizers or other soil treatment and plant nutrient substances. In FIGS. 10 and 11, the water cataract system is illustrated in two different cross sections according to the line *a—a* and *b—b* in FIG. 9.

A preferred irrigation system according to the invention is shown in FIGS. 5–8. This sample version represents a combination of waste water treatment system and the heretofore described irrigation system. The basic principle used for this purpose is the interposing before the water afferent ditches of so-called drip-screen systems which provide biological purification of the waste water. The waste water must thus be mechanically prepurified. It should contain no coarse materials or aggregates and preferably contain no chemical pollutants. This pre-purification can be accomplished in familiar purification systems, in filter and neutralization systems and in sediment trapping areas.

According to the invention, the pre-purified water is conducted into long elevated tanks 29 which can be spread out along the entire length of the fields. According to FIG. 5 the elevated tank consists of an upper section 33, a middle section 34 and a lower section, the sediment deposit tank 35. The upper and the middle sections 33, 34 are filled with drip-screens of clinkers, stone ballast, coke or the like. These drip-screens are composed of easily exchangeable units.

The waste water is conducted through a pressure line 30 which is provided with openings. Preferably, it is sprayed against the ceiling of the upper part 33 which for this purpose has a rough surface 37. The water then passes through the upper drip-screen 31 where a large portion of the organic materials are biologically degraded by aerobic microorganisms. To foster this process, warm air is introduced through a compressed air line 32. The water then seeps through the middle section 34 and the drip-screens 31 located here. Over its entire height, this middle section is penetrated by a compressed air line 39 provided with openings. In this way the drip-screen 31 is aereated and warmed over its entire height. The water then enters sediment deposit tank 35, in which any sediments still present are deposited. The silt can be pumped away by means of a pump line 36. The now-purified water is conducted into the water out-flow lines 38 and subsequently seeps away beneath the surface according to the above-described irrigation system.

An additional, smaller version of the drip-screen system is illustrated in FIG. 7. An oblong rectangular container 40 is filled with drip-screen material 42 as described above. The prepurified water is similarly conducted through a water pressure line 41 and sprayed above the drip-screen. Below the latter there is a compressed air line 43. Container 40 likewise has a sediment deposit tank 44 and a pump line 45.

FIG. 8 is an enlarged view of the detail circled in FIG. 7. Outside sediment deposit tank 44 a water afferent ditch 46 is connected for irrigating the fields — either by seepage or trapping. Ditch 46 has a lower opening for conducting water into the gravel layer 47. At the same time, an irrigation pipe 48 opens into ditch 46. The irrigation system, consisting of the secondary ditches and the subsurface irrigation system is thus the same as described in FIGS. 1, 2, 3 and 4. This method of purifying waste water makes it possible to include in the plan park areas, sports areas, thus providing recreation areas close to the city.

Figure 14:
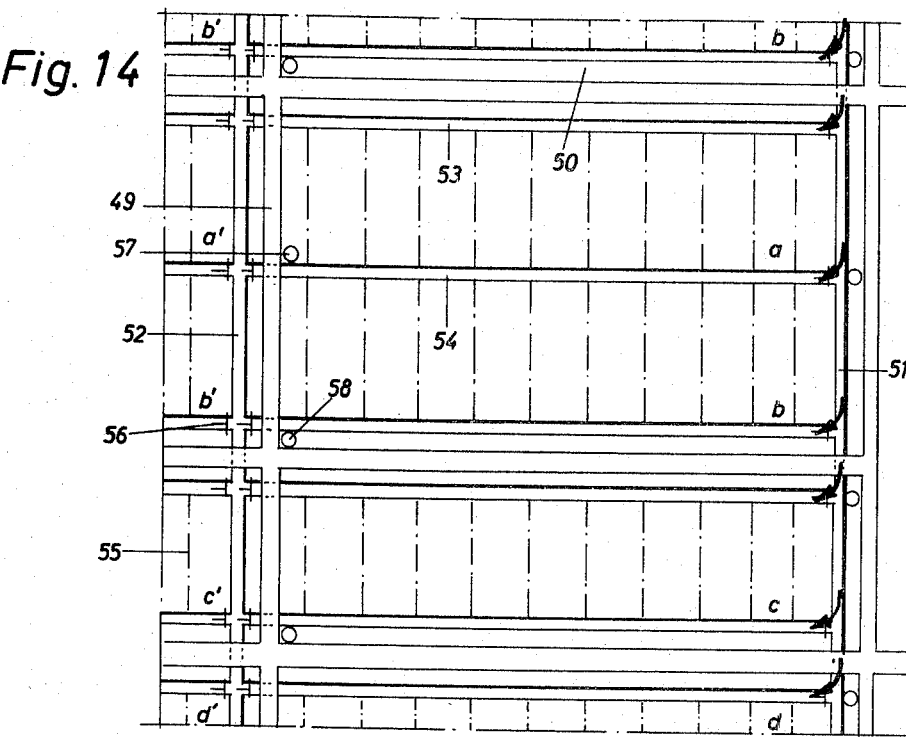
FIG. 14 is an irrigation system with individual fields which are enclosed by water afferent and water dispersion ditches, the irrigation pipes of which lead into the fields.
Figure 15:
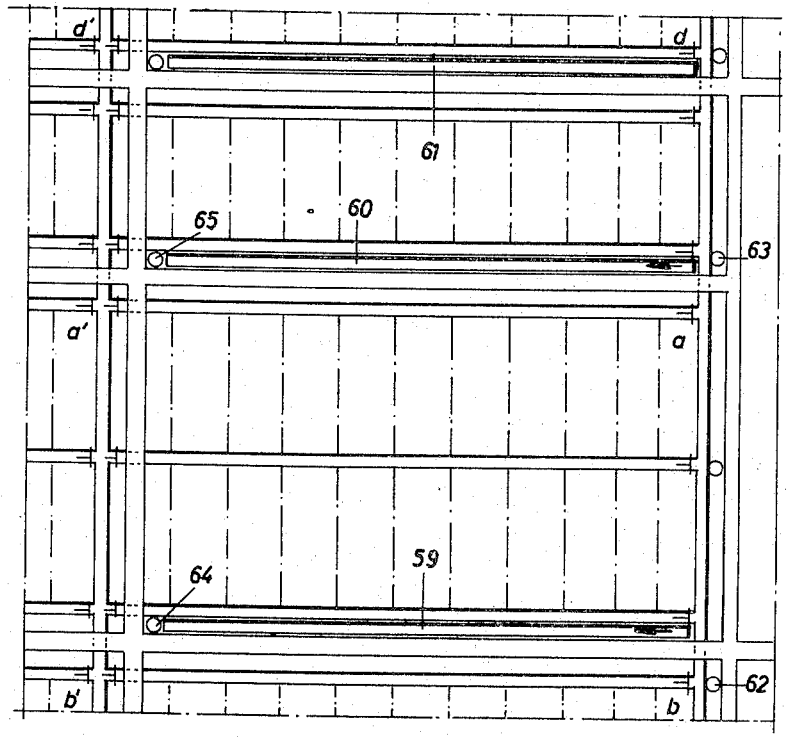
FIG. 15 is an irrigation system similar to FIG. 14, except that here a waste water treatment is additionally provided.

In FIGS. 14 and 15, two complete irrigation systems with fields and roads are illustrated, whereby FIG. 14 corresponds to the irrigation plant according to FIG. 1. FIG. 15 represents the combination of an irrigation system according to FIG. 1 and a waste water treatment system according to FIGS. 5-8.

In FIG. 14, the individual fields are designated by a', b, b', c, c' and d'. The individual fields can be reached by a road system 49, 50. The main afferent ditches 51, 52 from which proceed perpendicular field afferent ditches 53, 54, run along the edges of the fields. In this way, the water afferent ditch 54 constitutes the waste water line for field a and the water afferent line for the subsequent field b. All water conduit ditches can thus be water inputs as well as water outlets. The subsurface irrigation pipes, designated by 55, now branch off the secondary water afferent ditches. These irrigation pipes permit seepage of the water in the fields. At the same time, however, they permit water runoff when the fields are flooded and the water is trapped on the barrier layer. In addition, the secondary ditches 53, 54 are provided with openings for direct exit of the water into the gravel bed. All ditches are provided with slide valves 56 in order to close off the water or to flood the fields. Similarly, all irrigation pipes can be closed off at their mouths if necessary and the openings for direct entrance of the water into the gravel bed can be closed off by linked and simultaneously operated slide valves.

At the branch points of the collateral water ditches 53, 54 are located systems 57 for warming the water and enriching it with air and artificial fertilizers, e.g., corresponding to the water cataract system according to FIG. 9. In addition, concentration measuring points 58 and additive systems for artificial fertilizers are located along the fields. The thick arrows mark the direction of flow of the irrigation water. Accordingly the fields can be irrigated in the sequence b, a, b', c', d' as per FIG. 14. FIG. 15 additionally shows biological purification systems 59, 60, 61 along the fields as per FIG. 5-8. 62, 63 designate the pumping systems for supplying the drip-screens with waste water. For the backflow of the water in case of low water, pumping systems 64, 65 are provided with collection tanks. In other respects the irrigation system is the same as described in FIG. 14.

What is claimed is:

1. A water system for a field comprising in combination:

means, including main and perpendicular water afferent ditches extending completely around the field, for trapping water in the field;

a subsurface water system for said field connected to said ditches;

a drip screen system mounted in communication with at least one of said ditches; and means for selectively controlling the flow of water between said ditches and said subsurface irrigation system to selectively water, drain, and flood the field, wherein said drip screen systems comprise:

a. a three-part elevated tank having a top chamber, intermediate chamber, and bottom chamber, extending longitudinally of each of said perpendicular water afferent ditches;

b. said lower chamber of each tank having longitudinally spaced openings formed therein to communicate with a respective water afferent ditch; and c. a drip screen unit extending longitudinally in each of said upper and intermediate chambers.

2. An irrigation system according to claim 1 wherein a compressed air line extends longitudinally of and in underlying relationship to each of the upper and intermediate drip screen units, and wherein a plurality of vertically extending perforate compressed air lines connect said longitudinal air line at longitudinally spaced points through the drip screen material of said intermediate drip screen insert.

* * * * *